(12) United States Patent
Baker

(10) Patent No.: US 7,848,015 B2
(45) Date of Patent: *Dec. 7, 2010

(54) COMPACT TWO-ELEMENT INFRARED OBJECTIVE LENS AND IR OR THERMAL SIGHT FOR WEAPON HAVING VIEWING OPTICS

(75) Inventor: Allie M. Baker, Cypress, CA (US)

(73) Assignee: Goodrich Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/657,502

(22) Filed: Jan. 21, 2010

(65) Prior Publication Data

US 2010/0165455 A1 Jul. 1, 2010

Related U.S. Application Data

(63) Continuation of application No. 11/895,375, filed on Aug. 23, 2007, now Pat. No. 7,672,045.

(51) Int. Cl.
*G02B 13/14* (2006.01)
(52) U.S. Cl. ...................... 359/356; 356/247
(58) Field of Classification Search ................. None
See application file for complete search history.

(56) References Cited

U.S. PATENT DOCUMENTS

| | | | | |
|---|---|---|---|---|
| 3,674,330 A | 7/1972 | Strong | ............................ | 350/2 |
| 3,784,287 A | 1/1974 | Grey | ............................ | 359/790 |
| 3,792,535 A | 2/1974 | Marshall et al. | ............... | 434/22 |
| 3,912,379 A | 10/1975 | BeJager | ........................ | 359/789 |
| 3,944,337 A | 3/1976 | Ruben | ........................ | 359/716 |
| 3,992,078 A | 11/1976 | Freeman et al. | ............. | 359/356 |
| 4,109,995 A | 8/1978 | Betensky | .................... | 359/716 |
| 4,380,363 A | 4/1983 | Fjeldsted | .................... | 359/357 |
| 4,537,464 A | 8/1985 | Boutellier | ................... | 359/356 |
| 4,632,498 A | 12/1986 | Neil | ........................... | 359/354 |

(Continued)

OTHER PUBLICATIONS

Letter of Ephraim Secemski to Thomas A. Fairhall dated Nov. 5, 2009.

(Continued)

*Primary Examiner*—Lee Fineman
(74) *Attorney, Agent, or Firm*—McDonnell Boehnen Hulbert & Berghoff LLP

(57) ABSTRACT

A compact objective lens is disclosed which is particularly suitable for infrared optical systems. The lens features a simple design with only two lens elements, namely a first lens element receiving incident radiation and having front and rear surfaces, and a second lens element receiving incident radiation from the first element and having front and rear surfaces. The lens forms an image of a scene on a focal plane. At least three of the four surfaces of the elements are aspheric surfaces. The lens has an f-number less than about 2, a field-of-view less than about 30 degrees, and an effective focal length less than about 6 inches. The elements are made from a material selected to pass radiation in the infrared band of the electromagnetic spectrum, e.g., germanium. The lens is suitable for use as an objective lens for a long-wave infrared sight for small arms, e.g., rifle or shoulder-launched surface to air missile launching system, i.e., a lens optimized for operating in the electromagnetic spectrum between about 7.5 and about 15 micrometers.

7 Claims, 19 Drawing Sheets

U.S. PATENT DOCUMENTS

| | | | |
|---|---|---|---|
| 4,738,496 A | 4/1988 | Canzek | 359/357 |
| 4,921,318 A | 5/1990 | Szumski | 359/356 |
| 4,999,005 A | 3/1991 | Cooper | 359/356 |
| 5,067,803 A | 11/1991 | Ohno | 359/708 |
| 5,251,063 A | 10/1993 | Baumann | 359/355 |
| 5,446,581 A | 8/1995 | Jamieson | 359/357 |
| 5,627,674 A | 5/1997 | Robb | 359/355 |
| 5,737,120 A | 4/1998 | Arriola | 359/356 |
| 5,835,281 A | 11/1998 | Ohno | 359/692 |
| 5,901,452 A | 5/1999 | Clarkson | 42/131 |
| 6,018,414 A | 1/2000 | Chipper | 359/356 |
| 6,292,293 B1 | 9/2001 | Chipper | 359/356 |
| 6,460,437 B2 | 10/2002 | Ben-Menachem et al. | 82/1.3 |
| 6,507,432 B1 | 1/2003 | Watanabe | 359/356 |
| 6,622,599 B1 | 9/2003 | Ben-Menachem et al. | 82/1.3 |
| 7,028,595 B2 | 4/2006 | Ben-Menachem et al. | 82/1.3 |
| 7,042,656 B2 | 5/2006 | Chen et al. | 359/716 |
| 7,180,685 B2 | 2/2007 | Wang et al. | 359/717 |
| 2004/0036982 A1 | 2/2004 | Chipper | 359/676 |
| 2004/0188615 A1 | 9/2004 | DeFlumere | 250/338.1 |
| 2007/0010707 A1 | 1/2007 | Leiner et al. | 600/112 |

OTHER PUBLICATIONS

"Affidavit" of Dr. Yaacov Zerem dated Nov. 4, 2009 with exhibits.
Letter of Thomas A. Fairhall to Ephraim Secemski dated Nov. 16, 2009.
Letter of Ephraim Secemski to Thomas A. Fairhall dated Nov. 30, 2009.
Article in public use or on sale in USA: Ophir Optronics, Ltd., model 65067 lens circa 2002. Admitted prior art.
Email correspondence between Thomas A. Fairhall and Ephraim Secemski dated Dec. 4, 2009 and Dec. 7, 2009.
Letter of Ephraim Secemski to Thomas A. Fairhall dated Sep. 10, 2009.
Ophir Optronics, Ltd. catalog, 3 pages (2006).
Search Report and Written Opinion mailed Mar. 10, 2009 in PCT/US2008/009408, filed Jul. 31, 2008.
Apr. 2009 office action in U.S. Appl. No. 11/895,375, filed Aug. 23, 2007.
Jul. 7, 2009 response to office action in U.S. Appl. No. 11/895,375, filed Aug. 23, 2007.

POLYCHROMATIC DIFFRACTION THROUGH FOCUS MTF

POLYCHROMATIC DIFFRACTION MTF

CHROMATIC FOCAL SHIFT

EXAMPLE 2

POLYCHROMATIC DIFFRACTION THROUGH FOCUS MTF

POLYCHROMATIC DIFFRACTION MTF

CHROMATIC FOCAL SHIFT

EXAMPLE 3

TRANSVERSE RAY FAN PLOT

OPTICAL PATH DIFFERENCE

FULL SCALE = ± 1.0 WAVE

POLYCHROMATIC DIFFRACTION THROUGH FOCUS MTF

POLYCHROMATIC DIFFRACTION MTF

CHROMATIC FOCAL SHIFT

COMPACT TWO-ELEMENT INFRARED OBJECTIVE LENS AND IR OR THERMAL SIGHT FOR WEAPON HAVING VIEWING OPTICS

PRIORITY

This application is a continuation of prior application Ser. No. 11/895,375 filed Aug. 23, 2007, allowed, the content of which is incorporated by reference herein.

BACKGROUND OF THE INVENTION

This invention is related to the field of infrared (IR) optical systems. More particularly, this invention relates to a relatively compact imaging lens arrangement for an infrared optical system featuring two lens elements, a low f-number and diffraction-limited performance. The lens system is particularly suitable for incorporation into an infrared or thermal weapon sight.

Cameras, weapon sights, and other types of optical systems typically incorporate an imaging lens arrangement having a group of lenses which collect light from a scene and direct such light onto a detector placed at the focal plane of the optical system. A variety of lens designs are known in the art. Representative examples are disclosed in the following U.S. Pat. Nos. Chen et al., 7,042,656; Canzek, 4,738,496; Grey, 3,784,287; Cooper, 4,999,005; Ohno, U.S. Pat. Nos. 5,067,803 and 5,835,281; Ruben, 3,944,337; Chipper, 6,292,293; Betensky, 4,109,995 and DeJager 3,912,379. Other U.S. patents disclosing various lens designs include Baumann, U.S. Pat. Nos. 5,251,063; Jamieson, 5,446,581; Watanabe, 6,507,432; Boutellier, 4,537,464 and Fjelsted, 4,380,363.

Many of the prior art lens designs are not particularly suitable for use with thermal or IR sights for small arms, and particularly arms such as rifles carried by a soldier, because they incorporate a relatively large number of lens elements in the design and therefore require too much space, and/or are too heavy. Reducing the number of elements to just a few, such as two or three elements, as disclosed in the Chen et al. or Watanabe references above, allows the designs to be more compact and lighter in weight. The art has also taught that aspheric lens elements can be used in imaging lens arrangements. See, e.g., the Chen et al. reference. However, while the introduction of aspheric lenses may allow more compact lens arrangements to be arrived at, they may introduce unwanted aberrations and make such designs more difficult to achieve diffraction-limited performance.

This invention is ideally suited to the use of uncooled detectors that do not require a rear external cold stop as found in earlier detector assemblies. In the case of this invention, the aperture stop may have any position within the lens assembly.

This invention meets a need in the art for an improved compact objective lens arrangement suitable for imaging in the infrared portion of the spectrum. While there are many possible applications for the lens of this disclosure and the invention in its broader aspects is not limited to any particular application, the lens is especially suitable for use in IR or thermal weapon sights for small arms.

SUMMARY OF THE INVENTION

In a first aspect, a two element objective lens for an infrared optical system is disclosed. The design is a simple design having only two lens elements, namely a first lens receiving incident radiation and having front and rear surfaces, and a second lens receiving incident radiation from the first lens and having front and rear surfaces and directing light onto a focal plane. At least three, and optionally all four, of the surfaces of the first and second elements take the form of aspheric surfaces. The lens has an f-number less than about 2, a total field-of-view less than about 30 degrees, and an effective focal length less than about 6 inches The first and second elements are made from a material selected to pass radiation in the infrared band of the electromagnetic spectrum, such as germanium, gallium arsenide, zinc sulfide, zinc selenide, or other appropriate material.

The lens arrangement is suitable for compact lens designs as needed for small arms, and is light in weight and takes up a minimum of space, while achieving high optical performance. Specific embodiments are disclosed which achieve diffraction-limited performance. Specific embodiments are disclosed having short focal lengths of between about one and about four inches. Three exemplary and non-limiting examples are disclosed, including embodiments having an effective focal length of 28.3 mm (1.1 inch), 50.3 mm (2 inches) and 101.4 mm (4 inches). The specific embodiments feature f-numbers between 1.1 and 1.4, and maximum field angles between about ±6 and about ±13 degrees (total field-of-view between about 12 and 26 degrees).

Embodiments are disclosed which are particularly suitable for applications in the long-wave infra-red (LWIR) band of the spectrum, covering wavelengths between about 7.5 and about 15.0 micrometers. Each embodiment disclosed is unvignetted at all field angles.

The invention can further take the form of a long-wave infrared sight for weapon such as a small arms. The sight includes a detector for detecting infrared radiation (e.g., IR-sensitive photodiode array, un-cooled microbolometer array, or other device) and an objective lens in accordance with this disclosure. The weapon fitted with the sight may take the form of a small arm such as a rifle or shoulder-launched surface to surface or surface to air missile system. The invention can also be characterized as a small arm containing a LWIR sight having the objective lens of this disclosure.

BRIEF DESCRIPTION OF THE DRAWINGS

FIG. 3 is a transverse ray fan plot; FIG. 4 is a plot of the optical path difference (also called the transmitted wavefront error); FIG. 5 shows plots of the close sagittal (S) and tangential (T) field curvature and distortion; FIG. 6 is a plot of the polychromatic through-focus diffraction modulation-transfer-function (MTF); FIG. 7 is a plot of the best-focus polychromatic diffraction modulation-transfer-function; FIG. 8 is a plot of relative illumination as a function of field angle; and FIG. 9 is a plot of the paraxial focus for the axial image as a function of wavelength in the long-wave infrared band of the electromagnetic spectrum.

FIG. 11 is a transverse ray fan plot; FIG. 12 is a plot of the optical path difference; FIG. 13 are plots of the close sagittal (S) and tangential (T) field curvature and distortion of the lens design of FIG. 10. FIG. 14 is a plot of the polychromatic through-focus diffraction modulation-transfer-function; FIG. 15 is a plot of the polychromatic best-focus diffraction modulation-transfer-function; FIG. 16 is a plot of relative illumination as a function of field angle; and FIG. 17 is a plot of the paraxial focus as a function of wavelength in the long-wave infrared band of the electromagnetic spectrum.

FIG. 19 is a transverse ray fan plot; FIG. 20 is a plot of the optical path difference; FIG. 21 are plots of the close sagittal (S) and tangential (T) field curvature and distortion; FIG. 22 is a plot of the polychromatic through-focus diffraction modulation-transfer-function; FIG. 23 is a plot of the polychromatic best-focus diffraction modulation-transfer-function; FIG. 24 is a plot of relative illumination as a function of field angle; and FIG. 25 is a plot of the paraxial focus as a function of wavelength in the long-wave infrared band of the electromagnetic spectrum.

DETAILED DESCRIPTION OF THE PREFERRED EMBODIMENTS

Figure 1:
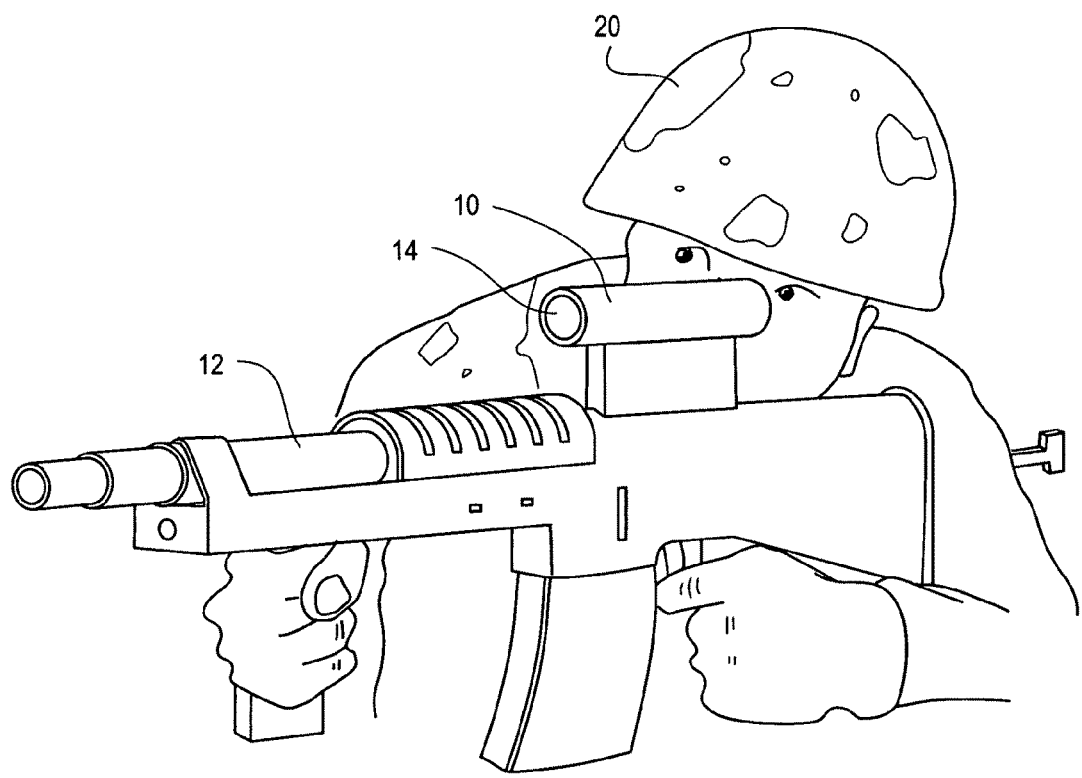
FIG. 1 is a perspective view of a small arm (e.g., rifle) equipped with a LWIR imaging sight having a lens arrangement in accordance with the present invention.

This invention is directed to a two-element objective lens for an infrared optical system. With reference to FIG. 1, in one example the infrared (IR) optical system takes the form of an infrared sight 10 for a small arms weapon (e.g. rifle 12). The sight includes an objective lens 14. The function of the objective lens 14 is to collect radiation from the scene and form an image of the scene at a focal plane within the sight 10. An infrared radiation collection device or detector (not shown) in the form of a photodiode focal plane array (FPA), microbolometer focal plane array, or other type of detector is located at the focal plane of the lens system and generates a still or motion video signal from the IR or thermal image of the scene, which is displayed to the soldier 20 as he looks through the sight 10 via a display (not shown) located at the proximal end of the sight. The soldier's display is created by an electronic module that receives the IR image from the lens and produces an erect image with sufficient brightness and resolution to be suitable for viewing under the conditions of the current mission. The display is conventional and the details are not important. A reticle showing the aim point of the weapon is superimposed on the IR or thermal image. Because the weapon 12 is portable and carried by a soldier 20, the sight 10 needs to be compact and lightweight. The sight 10 is fastened or attached to the rifle 12 in a boresight aligned condition in any suitable fashion, the details of which are not important.

The sight 10 is designed to operate in the infrared portion of the spectrum. Thus, the objective lens 14 is designed to operate in the infrared portion of the electromagnetic spectrum. The specific examples of this disclosure described below are designed to operate in the long-wave infrared (LWIR), with wavelengths between about 7.5 and about 15 micrometers. Other designs may operate in the short-wave infrared (SWIR) (about 1.2 to about 3 micrometers) and mid-wave infrared (MWIR) (about 3 to about 6 micrometers).

The three different embodiments of the objective lens 14 described below and shown in FIGS. 2, 10 and 18 have several common features. Firstly, they are simple designs with only two lens elements. The lenses include a first lens element 30 receiving incident radiation and having front and rear surfaces 32 and 34, respectively, and a second lens element 40 receiving incident radiation from the first lens element 30 and having front and rear surfaces 42 and 44, respectively. The first and second lenses 30 and 40 form an image on a focal plane 50. The infrared detection device (not shown) is located at the focal plane 50. Other optical components (not shown) such as filters may be included somewhere in the optical path.

Additionally, in the various embodiments at least three of the surfaces of the first and second elements comprise aspheric surfaces. In the embodiment of FIG. 2, all four surfaces 32, 34, 42 and 44 are aspheric. In the embodiments of FIGS. 10 and 18, surfaces 34, 42 and 44 are aspheric and surface 32 is spherical. The aspheric constants for the illustrated embodiments are given in the Appendices to this document.

Additionally, in the various embodiments the lens has a relative aperture size with F-number faster than f/2. In the embodiment of FIG. 2, the f-number is 1.1. In the embodiment of FIGS. 10 and 18, the f-number is 1.4.

Additionally, in the various embodiments the first and second elements 30 and 40 are made from a material selected to pass radiation in the infrared band of the electromagnetic spectrum. The material may comprise germanium, gallium arsenide, zinc sulfide, zinc selenide, or other material specifically designed for passing the desired IR band wavelength. The choice of materials will depend on several factors, such as the band of interest, the specifics of the lens prescription, the f-number, focal length, the degree of optical correction and other factors. In the illustrated embodiments of FIGS. 2 and 10, both lenses are constructed from germanium, which is transparent to infrared light and has a high refractive index. In one possible embodiment, the lens has an effective focal length of less than six inches.

The three examples set forth all meet this criterion. In another embodiment, the lens has an effective focal length of between about two and about four inches. Examples 2 and 3 (FIGS. 10 and 18) meet this criterion. In another possible embodiment, the lens has an effective focal length of between about one and about two inches. Examples 1 and 2 (FIGS. 2 and 10) meet this criterion. The objective lenses of this disclosure are highly suitable for applications where space and weight are constraints, such as in the example of sights for small arms.

Additionally, the embodiments exhibit a maximum radial field or field angle of between about ±5 and about ±15 degrees, or, equivalently, a total field-of-view of between about 10 and about 30 degrees. While this field-of-view may not be as wide as that of some prior art arrangements, such as the designs of the Chen et al. patent referenced earlier which describes embodiments with a field-of-view of greater than 45 degrees, the tradeoff of providing less field-of-view (between 10 and 30 degrees) allows the design to achieve a higher performance (even diffraction-limited performance) as indicated in the illustrated embodiments, with minimal chromatic aberration, in a compact two lens arrangement.

Preferred embodiments of the lens feature diffraction-limited performance. This performance is demonstrated in the performance curves of FIGS. 3-9 for the embodiment of FIG. 2, FIGS. 11-17 for the embodiment of FIG. 10, and FIGS. 19-25 for the embodiment of FIG. 18. The performance curves are also discussed in the following sections.

Example 1

Figure 2:
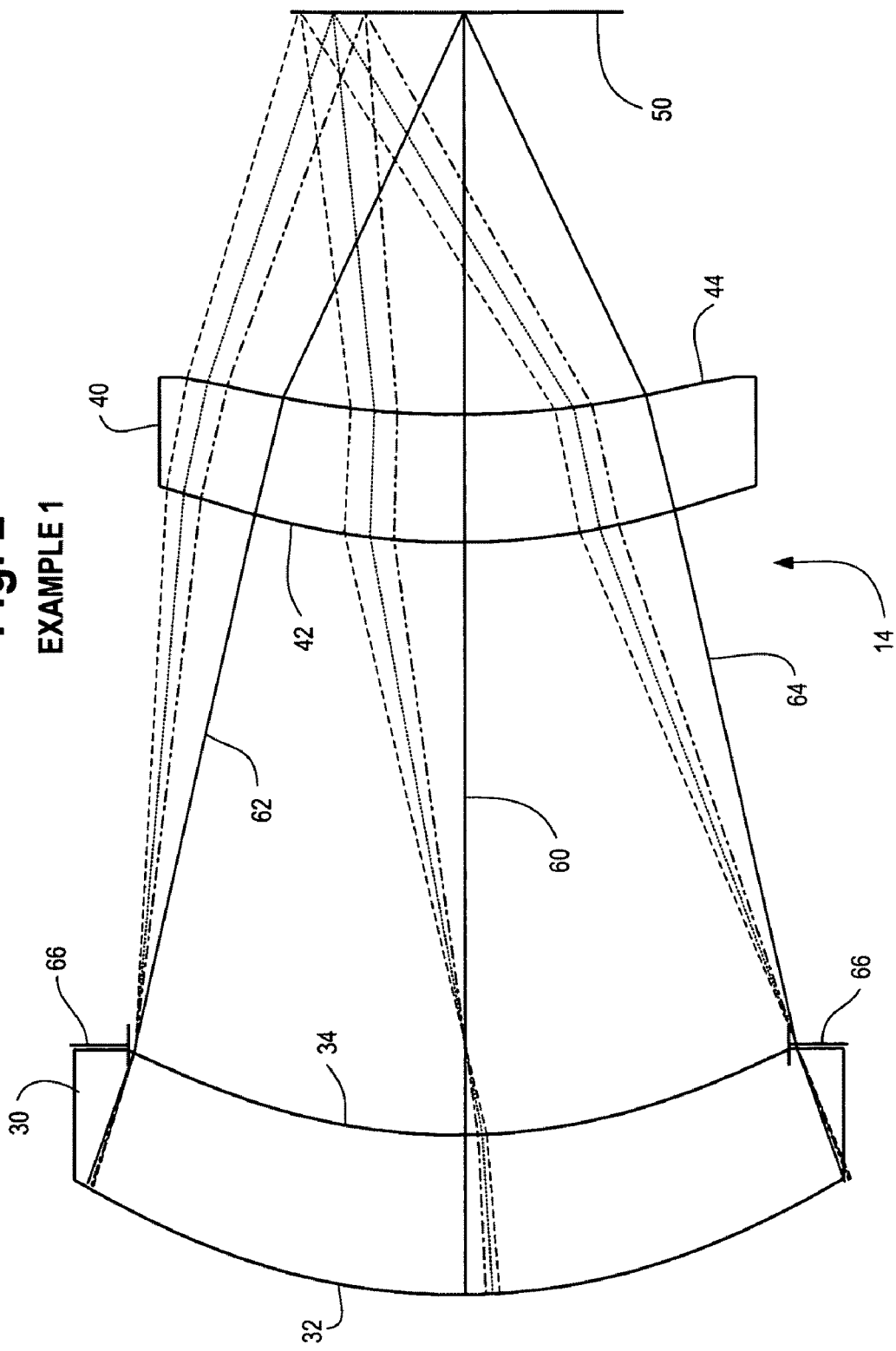
FIG. 2 is an illustration of a lens design in accordance with a first embodiment, with the design having a 28.3 mm focal length, f-number of 1.1, a field angle of ±11.2 degrees (total field-of-view 22.4 degrees), two lens elements each having two aspherical surfaces and the lens elements constructed from germanium.

28.3 mm Focal Length, F1.1 Two Element IR Objective Lens (FIG. 2)

FIG. 2 is an illustration of a lens design in accordance with a first embodiment. The design is optimized to operate in the long-wave infrared (LWIR) band of the electromagnetic spectrum. The design features two lens elements 30 and 40. Front surface 32 of the first lens element 30 is convex and receives incident radiation from the scene. Rear surface 34 is concave. The front surface 42 of the second lens element 40 is convex and the rear surface 44 is concave. Surfaces 32, 34, 42 and 44 are aspherical. The details of the prescription of the lenses are set forth in the Appendix A. The lens elements 30 and 40 are made from germanium in the illustrated embodiment. The lens elements direct radiation onto the focal plane 50. A thermal or IR detection device (riot shown) is placed at the focal plane 50.

The design has a 28.3 mm focal length, an f-number of 1.1, and a field angle of ±11.2 degrees (total field-of-view 22.4 degrees).

FIG. 2 also shows the upper and lower rays 60, 62 and 64 for the axial field as well as for the other fields. Ray 60 lies along the optical axis of the lens 14. An aperture stop 66 is located adjacent to the first lens 30 between the first lens and the second lens 40 as shown in FIG. 2.

FIGS. 3-9 are performance curves showing the optical performance of the lens design of the first embodiment of FIG. 2. The design features diffraction-limited performance.

Figure 3:
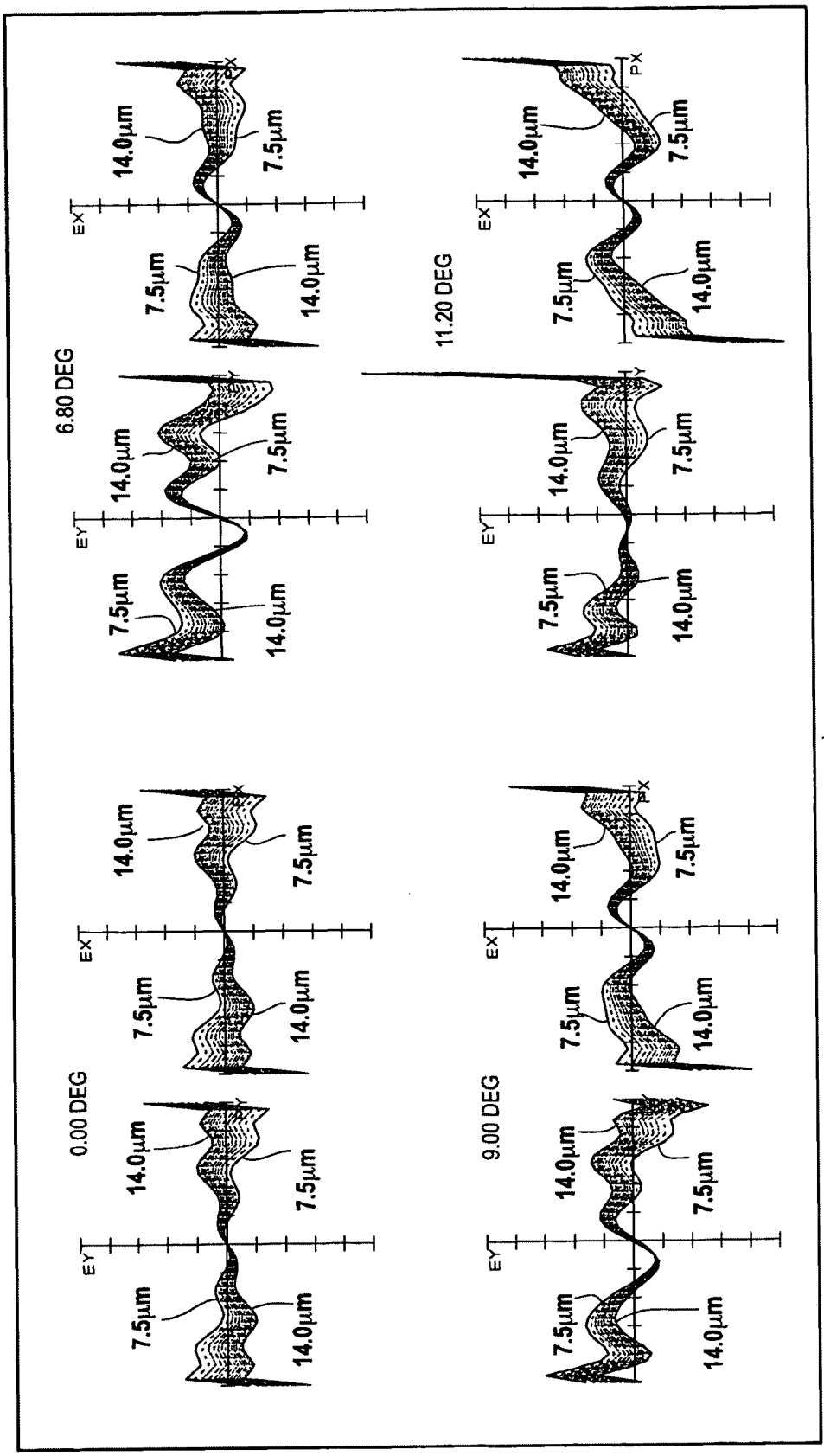
FIGS. 3-9 are performance curves showing the optical performance of the lens design of the first embodiment of FIG. 2. In particular.

FIG. 3 is a transverse ray aberration fan plot. These plots show the height errors in the rays striking the focal plane for a number of wavelengths spanning the long-wave infrared spectrum of interest. The axial chromatic aberration is uncorrected but the ray spread in the focal plane is small enough to not adversely affect the image quality. The shape of these curves indicates a high degree of symmetry.

Figure 4:
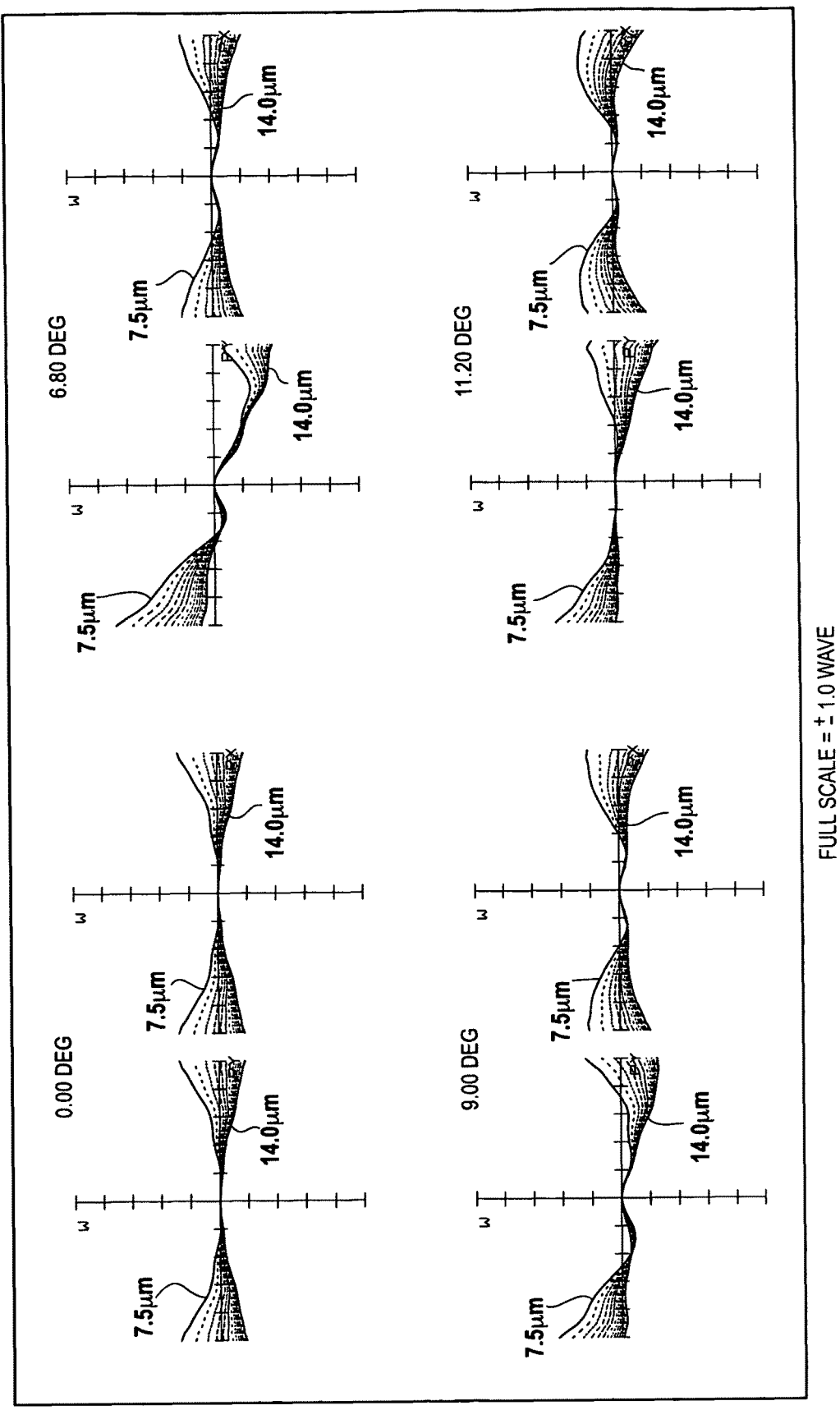

FIG. 4 is a plot of the optical path difference. The optical path difference curves represent a wavefront description of image quality. Complete symmetry would indicate the absence of coma aberrations; small asymmetry does exist but not sufficient to adversely affect the image quality.

Figure 5:
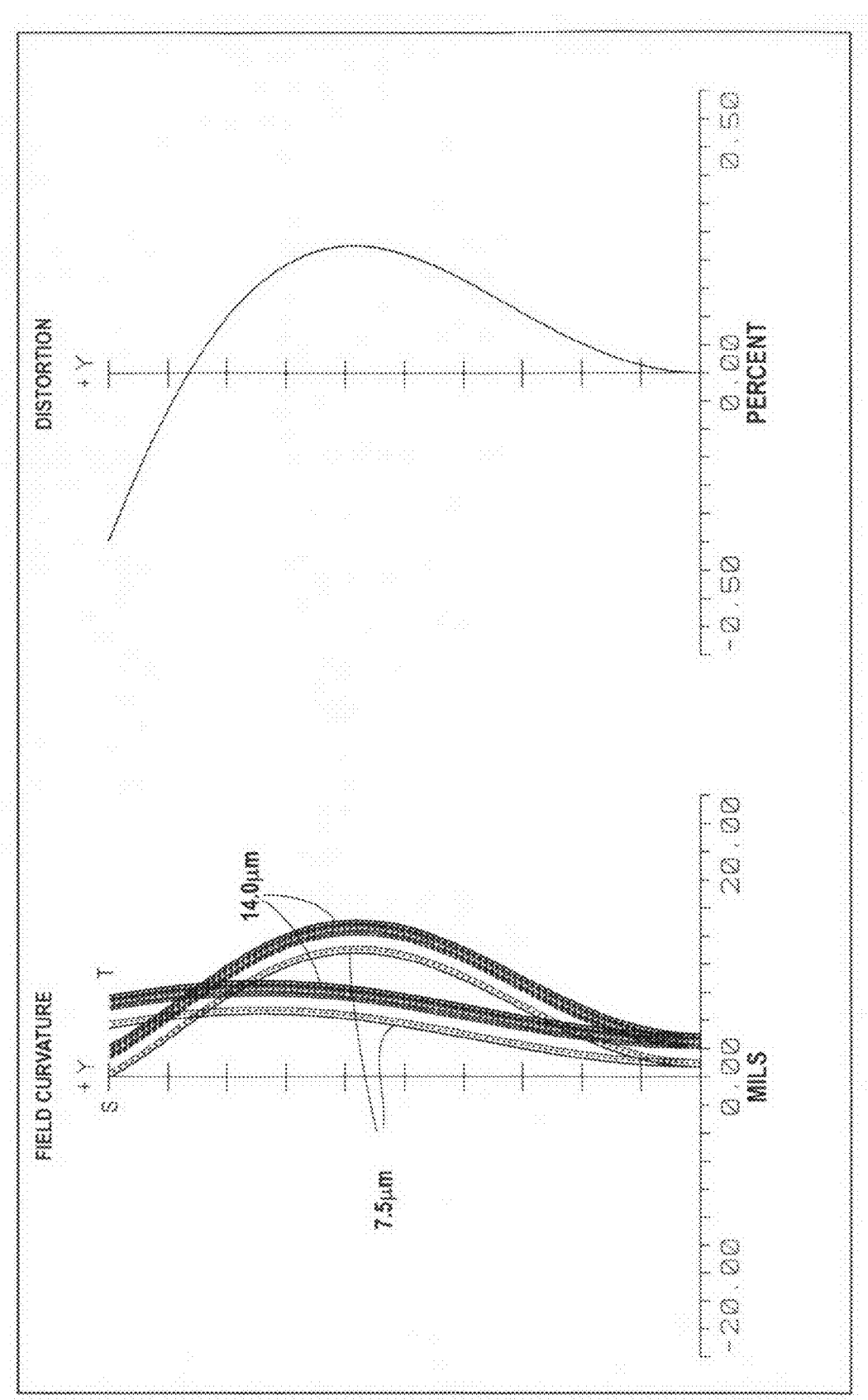

FIG. 5 are plots of the field curvature and distortion. The field curvature curves represent the close sagittal and close tangential focus curves after Coddington; these are indicated for a number of wavelengths. The actual surfaces of best-focus will be later shown in the through-focus MTF curves. Distortion is well controlled and bounded to be less than about 0.25% although calibrated distortion may be employed for small adjustments.

Figure 6:
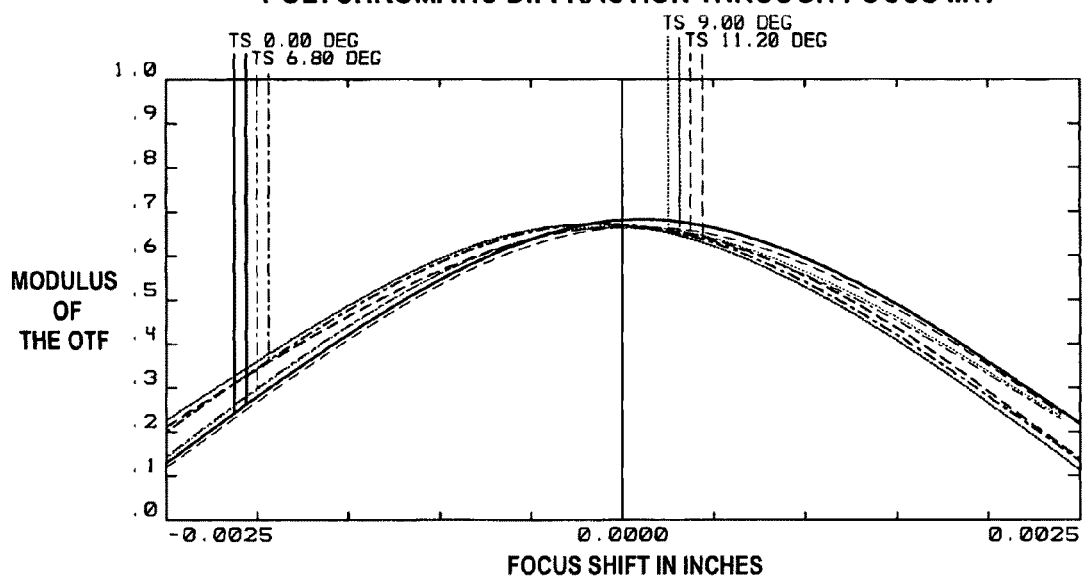

FIG. 6 is a plot of the polychromatic through-focus diffraction modulation-transfer-function. These curves show the MTF performance over a range of focus positions around best-focus for each field angle. The peaks of the individual curves occur at nearly the same axial position indicating a quite flat field.

Figure 7:
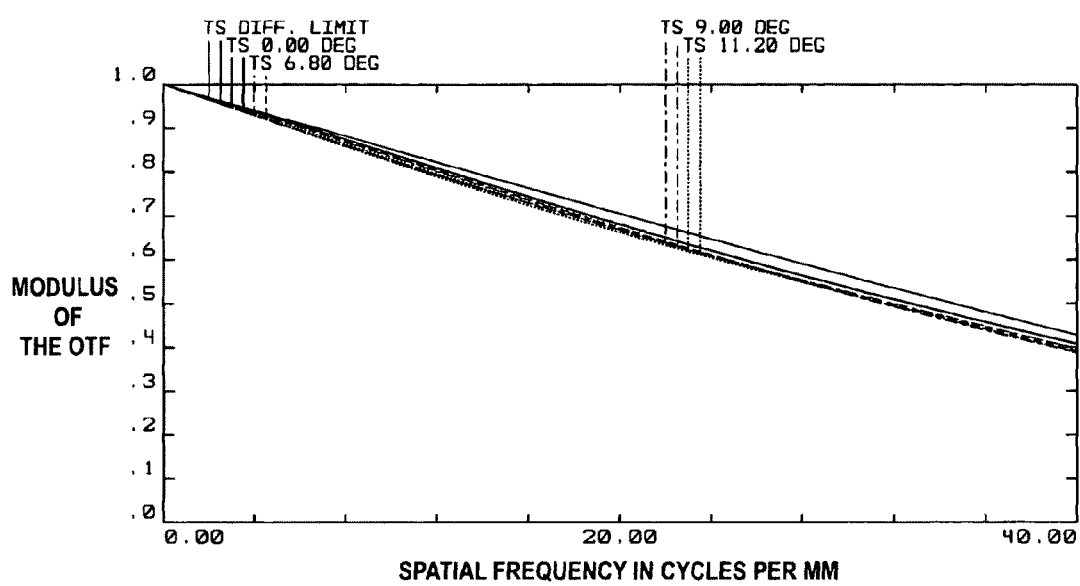

FIG. 7 is a plot of the polychromatic best-focus diffraction modulation-transfer-function. It is clear that the image quality of each field is quite close to the diffraction limit (the highest curve) and that the optical system may be called diffraction-limited. This very good quality is exceptional for such a simple system.

Figure 8:
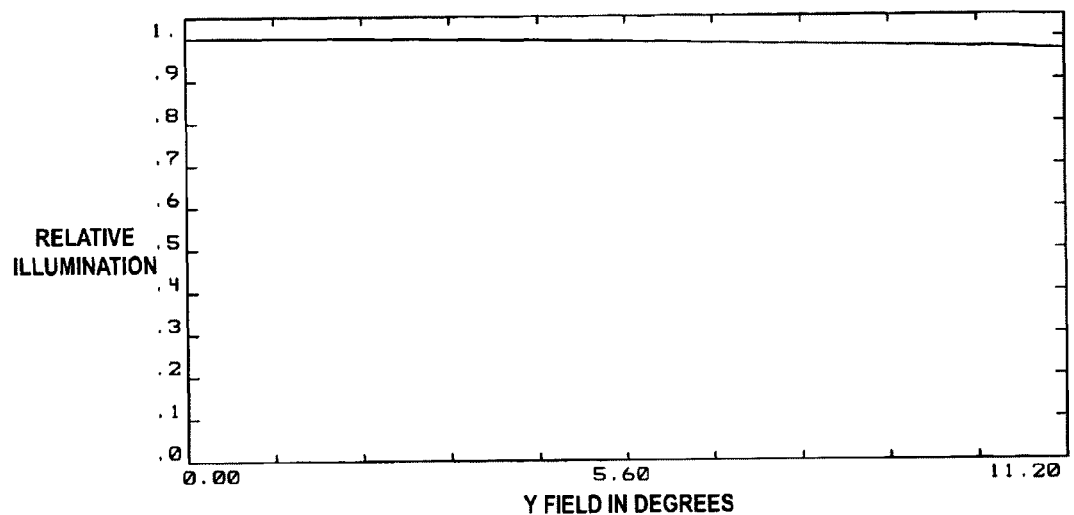

FIG. 8 is a plot of relative illumination as a function of field angle. The relative illumination (or in this case relative irradiation) represents the normalized radiant flux per unit area in the focal plane as a weighted average for the given spectral range of interest. It is important for this class of optical systems when used as a weapon sight to maintain the relative illumination well above 90%.

Figure 9:
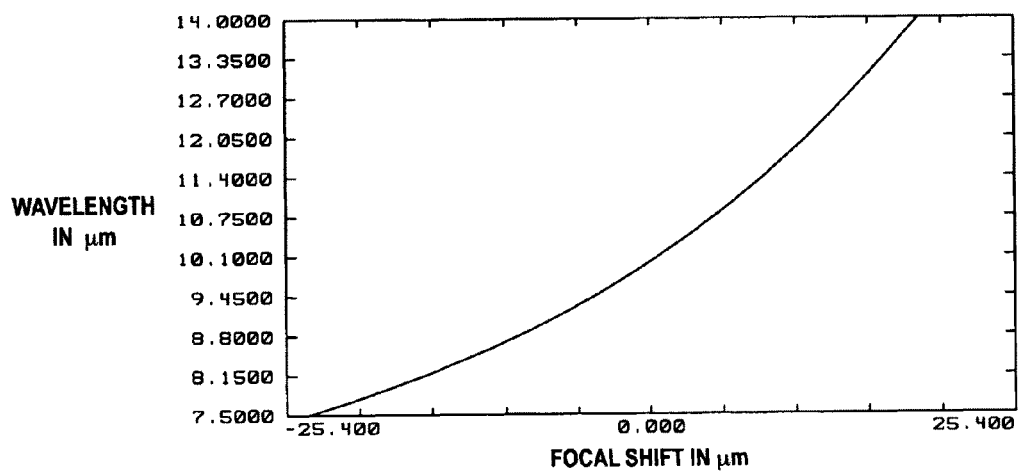

FIG. 9 is a plot of the paraxial focus for the axial image as a function of wavelengths in the infrared band of the electromagnetic spectrum. Clearly, the axial chromatic aberration is uncorrected as described earlier. However, the color spread is sufficiently small to have no serious adverse effect on the image quality.

Example 2

Figure 10:
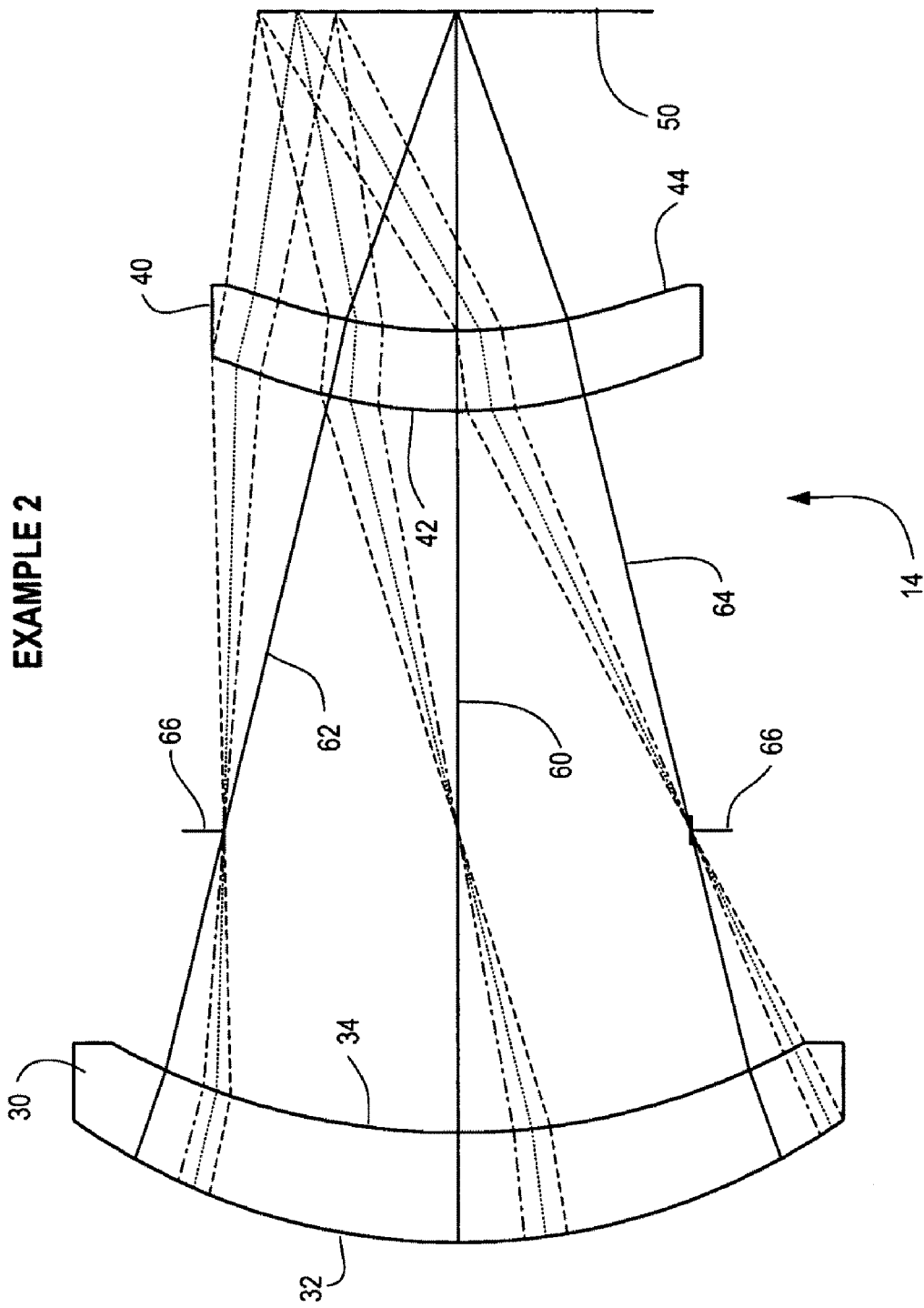
FIG. 10 is an illustration of a lens design in accordance with a second embodiment, with the design having a 50.3 mm focal length, f-number of 1.4, field angle of ±12.4 degrees (total field-of-view of 24.8 degrees), two lens elements having a total of three aspherical surfaces and one spherical surface, and the lens elements constructed from germanium.

50.3 mm F1.4 Two Element IR Objective Lens (FIG. 10)

FIG. 10 is an illustration of a lens 14 in accordance with a second embodiment. The lens is designed to operate in the long-wavelength infrared. The lens features a first lens element 30 with front and rear surfaces 32 and 34, and a second lens element 40 having front and rear surfaces 42 and 44, respectively, which direct incident light from a scene and form an image on a focal plane 50. Surfaces 32 and 42 are convex and surfaces 34 and 44 are concave. A detection device (not shown) for detecting radiation in the IR portion of the spectrum is located at the focal plane 50. An aperture stop 66 is placed between the first and second lens elements 30 and 40.

Lens surfaces 34, 42 and 44 are aspherical. Lens surface 32 is spherical. The prescription for the lens elements 30 and 40 are given in Appendix B. The lens elements are constructed from germanium.

The design has a 50.3 mm focal length, f-number of 1.4, and a field angle of ±12.4 degrees (total field-of-view of 24.8 degrees).

FIGS. 11-17 are performance curves showing the optical performance of the lens design of the second embodiment of FIG. 10. The design features diffraction-limited performance.

Figure 11:
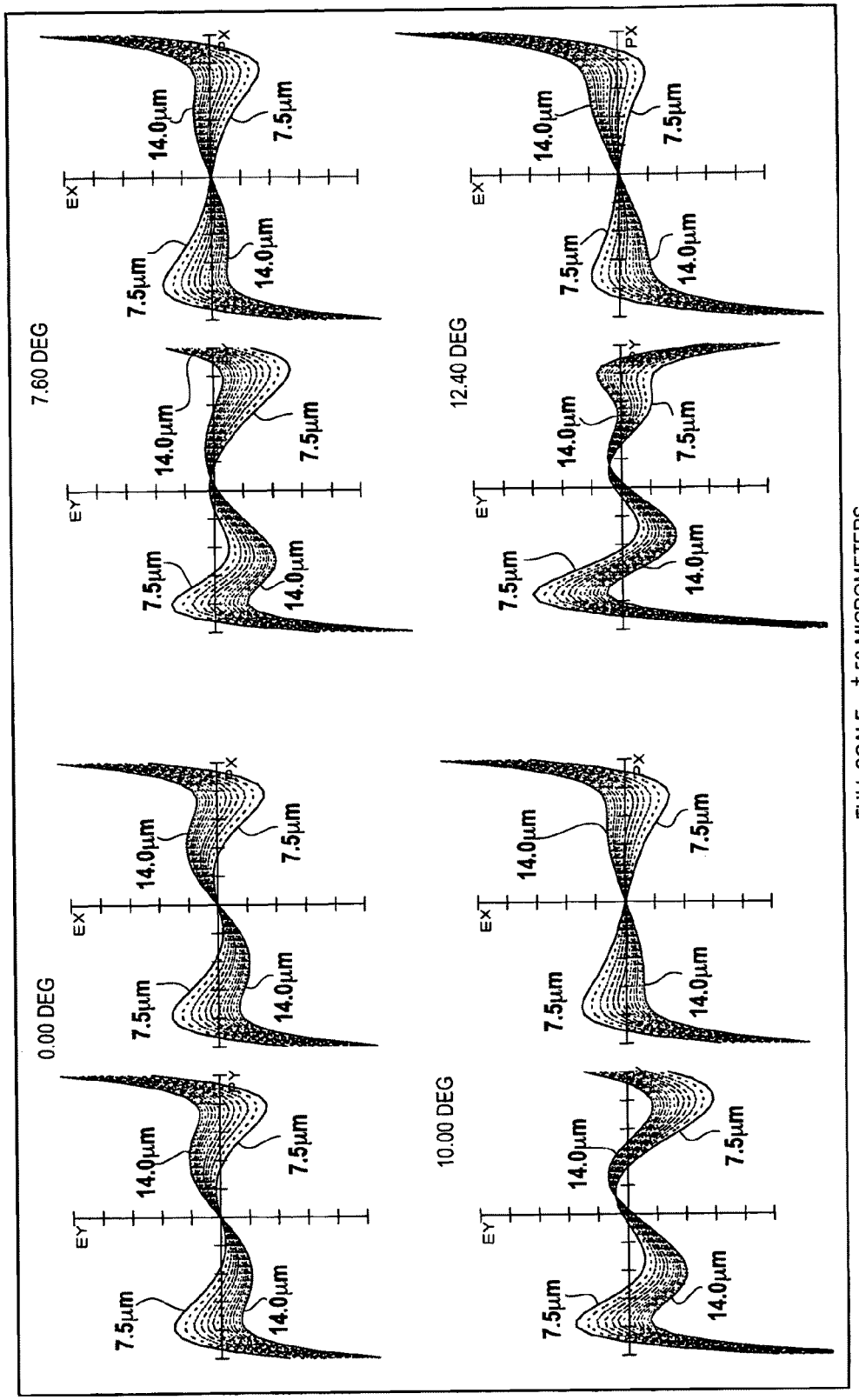
FIGS. 11-17 are performance curves showing the optical performance of the lens design of the second embodiment of FIG. 10. In particular.
Figure 12:
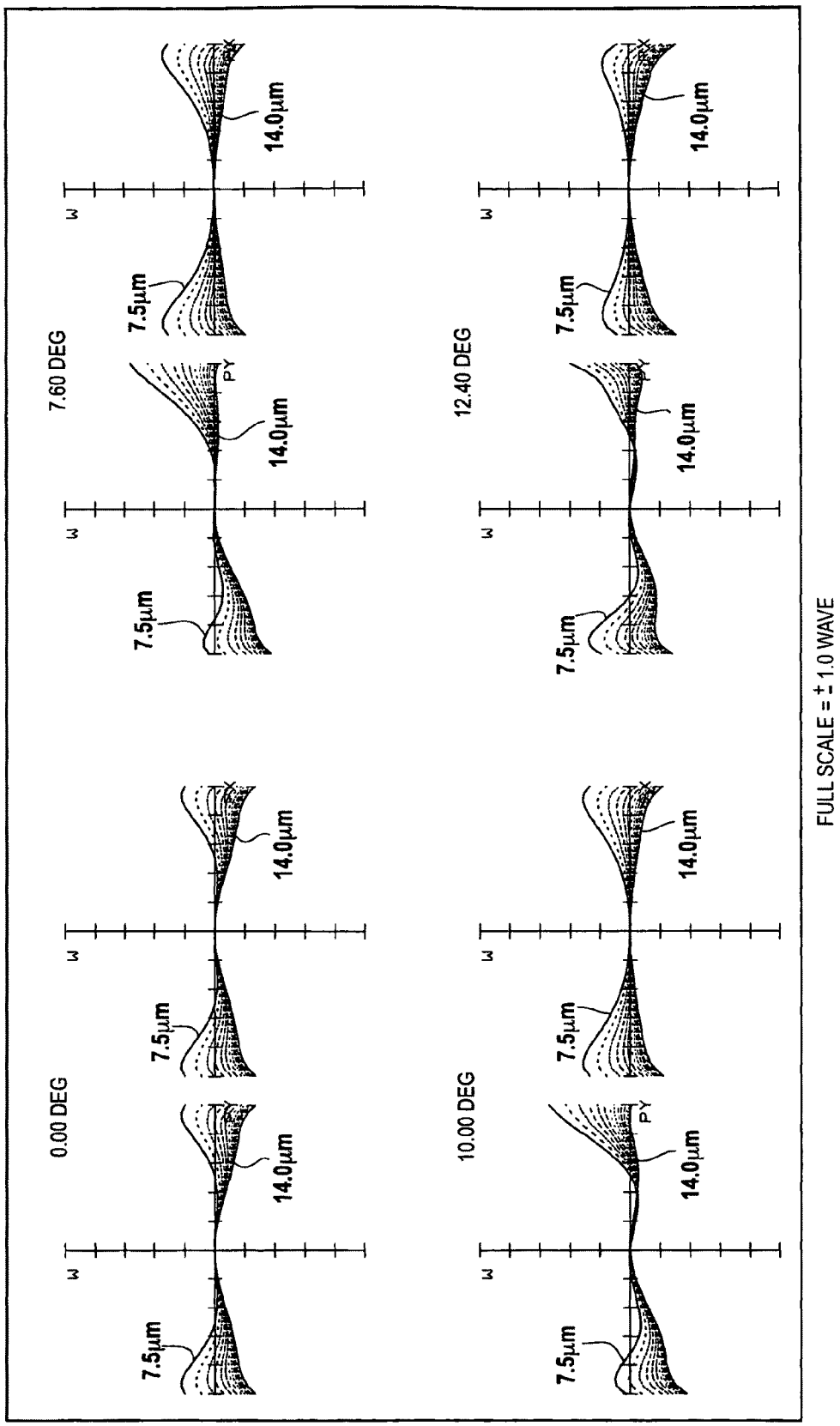
Figure 13:
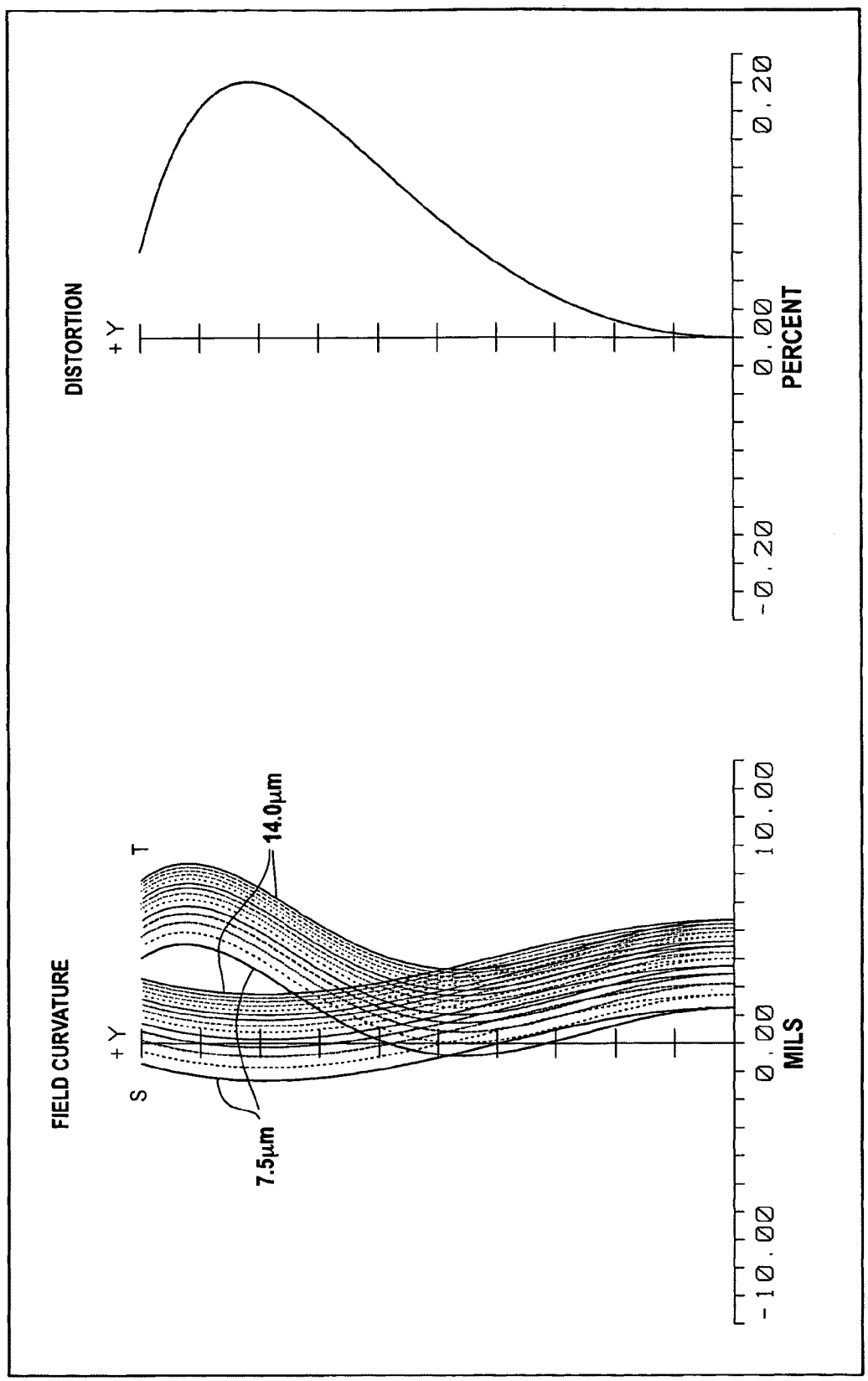
Figure 14:
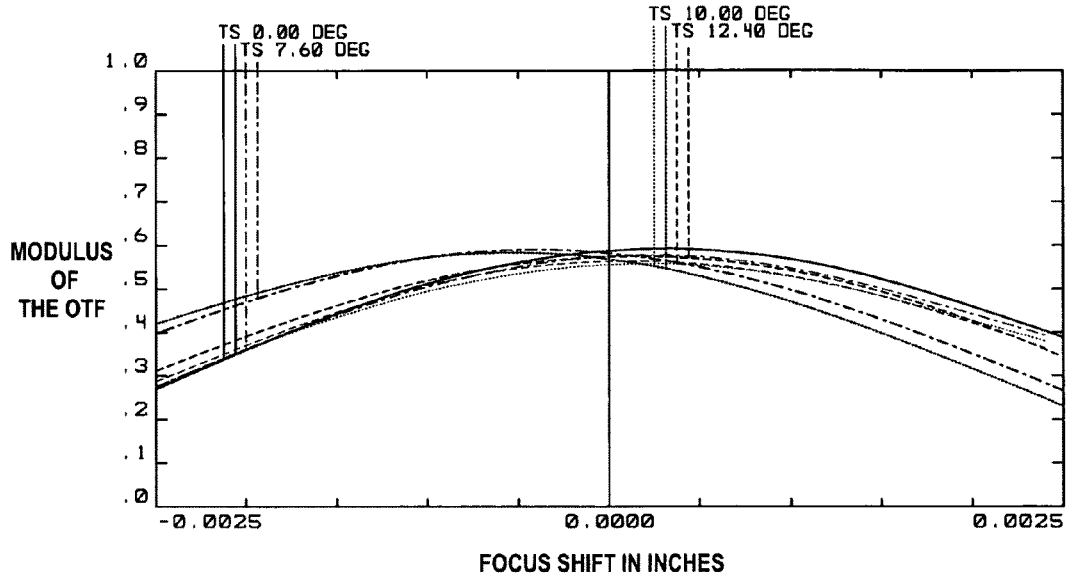
Figure 15:
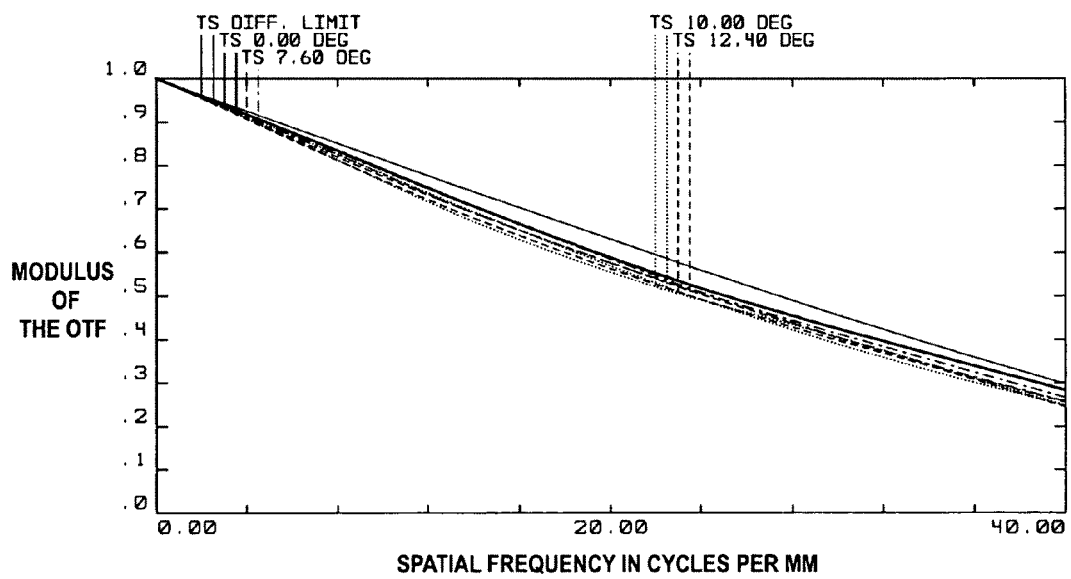
Figure 16:
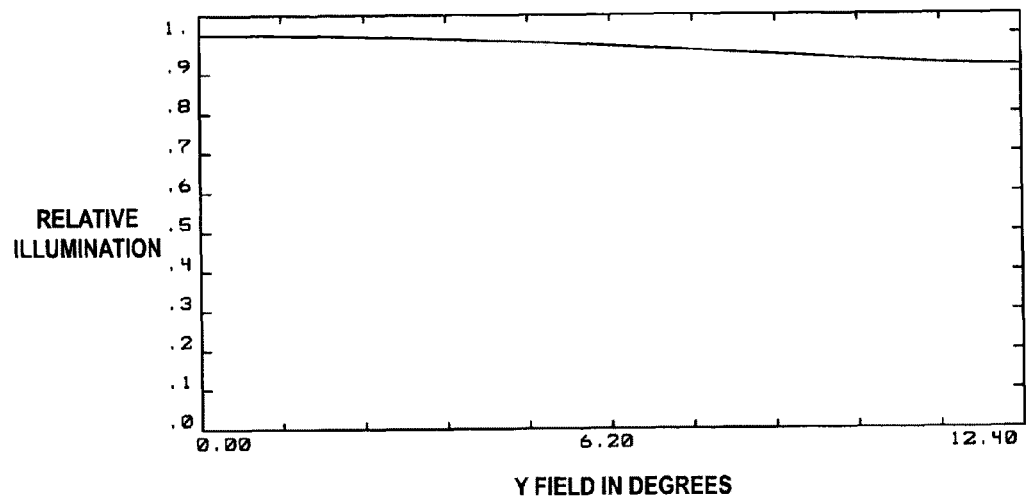
Figure 17:
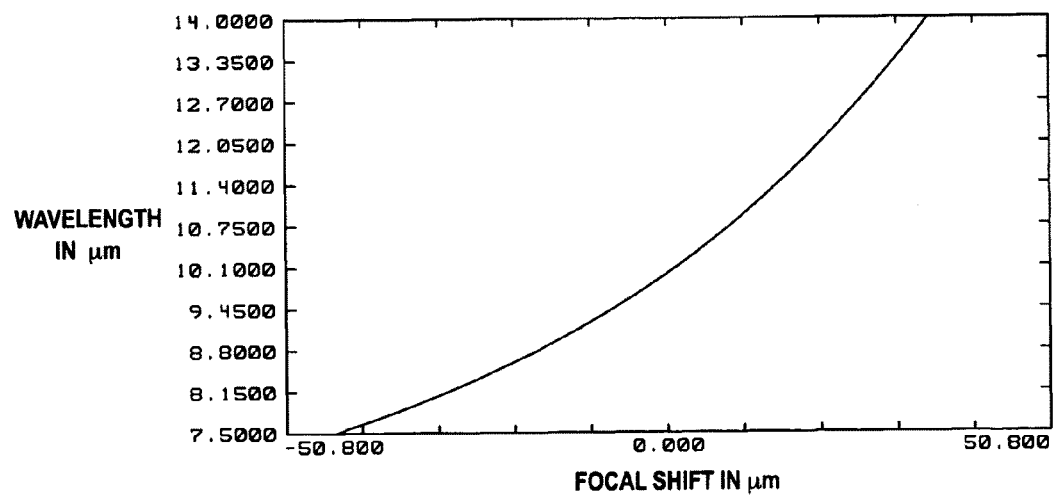

FIG. 11 is a transverse ray fan plot for a number of wavelengths. FIG. 12 is a plot of the optical path difference for a number of wavelengths. FIG. 13 are plots of the field curvature and distortion of the lens design of FIG. 10. FIG. 14 is a plot of the polychromatic through-focus diffraction modulation-transfer-function. FIG. 15 is a plot of the polychromatic best-focus diffraction modulation-transfer-function. FIG. 16 is a plot of relative illumination as a function of field angle. FIG. 17 is a plot of the paraxial focus as a function of wavelength in the infrared band of the electromagnetic spectrum.

The commentary regarding the performance curves of FIGS. 3-9 is also applicable to the performance curves of FIGS. 11-17.

Example 3

Figure 18:
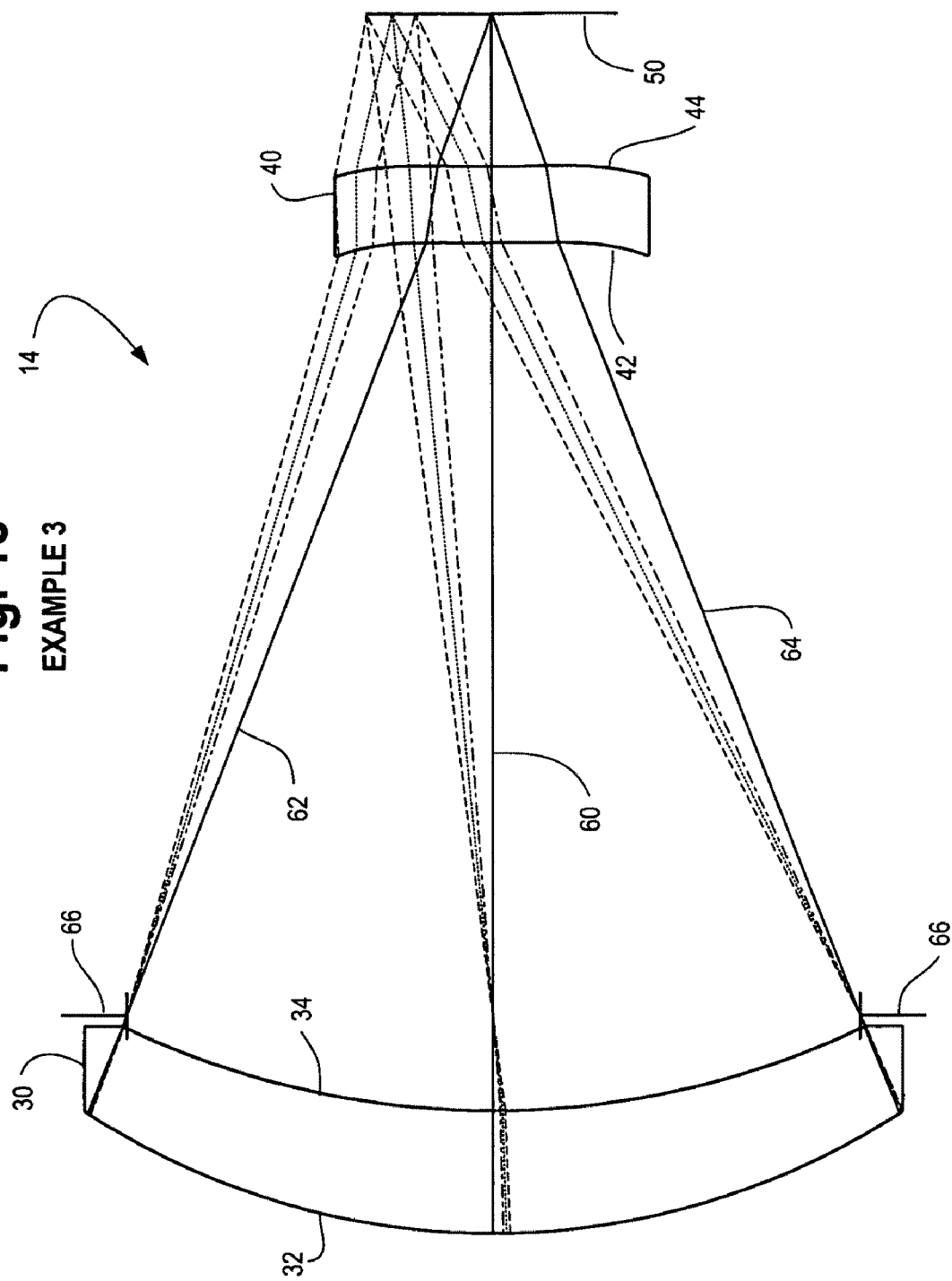
FIG. 18 is an illustration Of a lens design in accordance with a third embodiment, with the design having a 101.4 mm focal length, f-number of 1.4, field angle of ±6.3 degrees (total field-of-view of 12.6 degrees), two lens elements with three aspherical surfaces and one spherical surface, and the lens elements constructed from germanium and zinc sulfide.

101.4 mm F1.4 Two Element LWIR Objective Lens (FIG. 18)

FIG. 18 is an illustration of a lens design 14 in accordance with a third embodiment. The lens 14 features a first lens element 30 and a second lens element 40 which together form an image on a focal plane 50. Surface 32 of lens element 30 is convex relative to the focal plane 50; surface 34 of lens element 30 is concave relative to the focal plane 50. Surface 42 of lens element 40 is concave, as is lens surface 44. Surface 32 is spherical and surfaces 34, 42 and 44 are aspherical. The prescription of the lens 14 is given in Appendix C. The lens is designed to operate in the long-wave infrared. Accordingly, the lens elements 30 and 40 are constructed from a material selected to pass radiation in this band. In this example lens element 30 is made from germanium and lens element 40 is made from zinc sulfide.

An aperture stop 66 is placed adjacent to the lens element 30 between the first and second lens elements 30 and 40, respectively.

The design of FIG. 18 has a 101.4 mm focal length, an f-number of 1.4, and a field angle of ±6.3 degrees (total field-of-view of 12.6 degrees).

Figure 19:
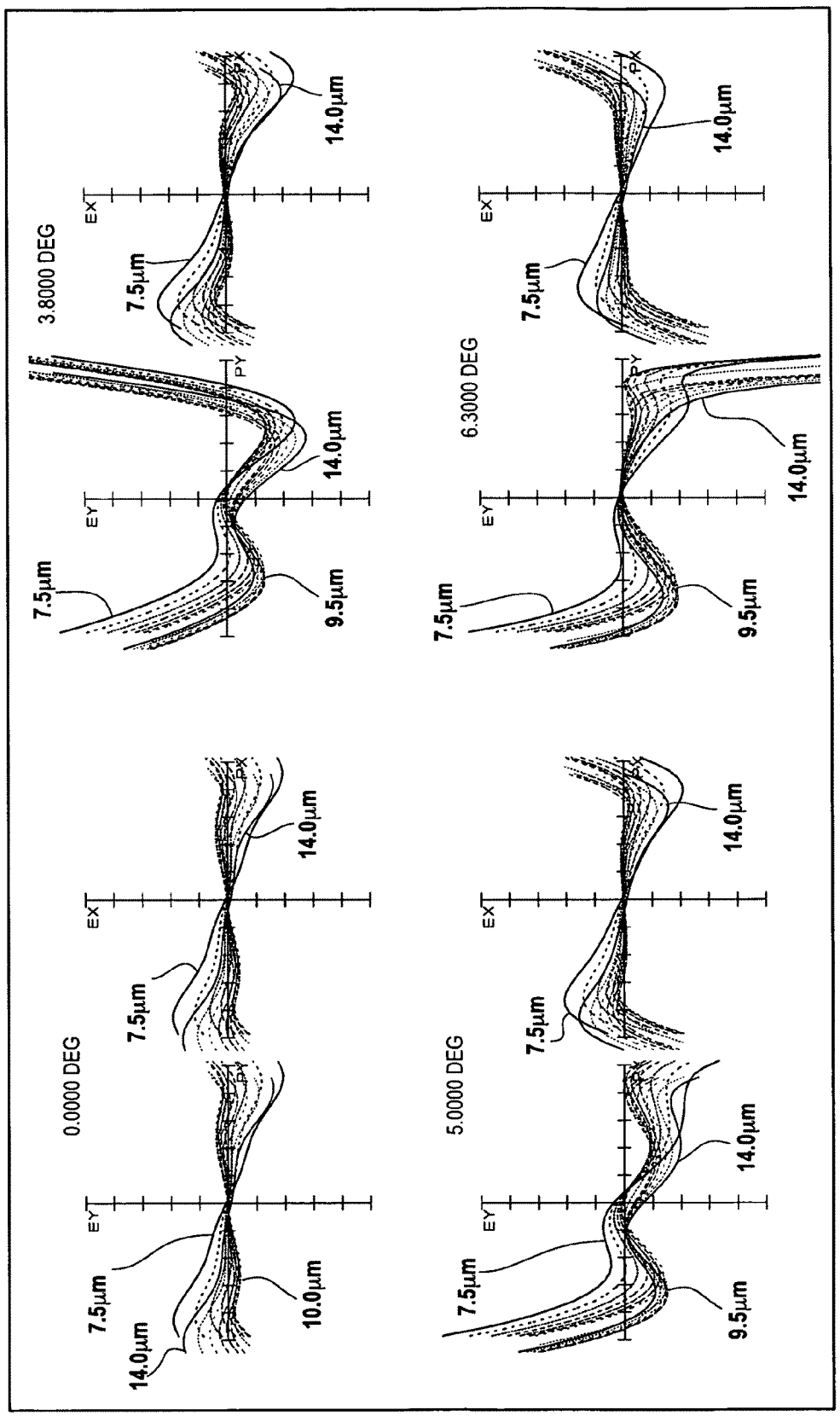
FIGS. 19-25 are performance curves showing the optical performance of the lens design of the third embodiment of FIG. 18. In particular.
Figure 20:
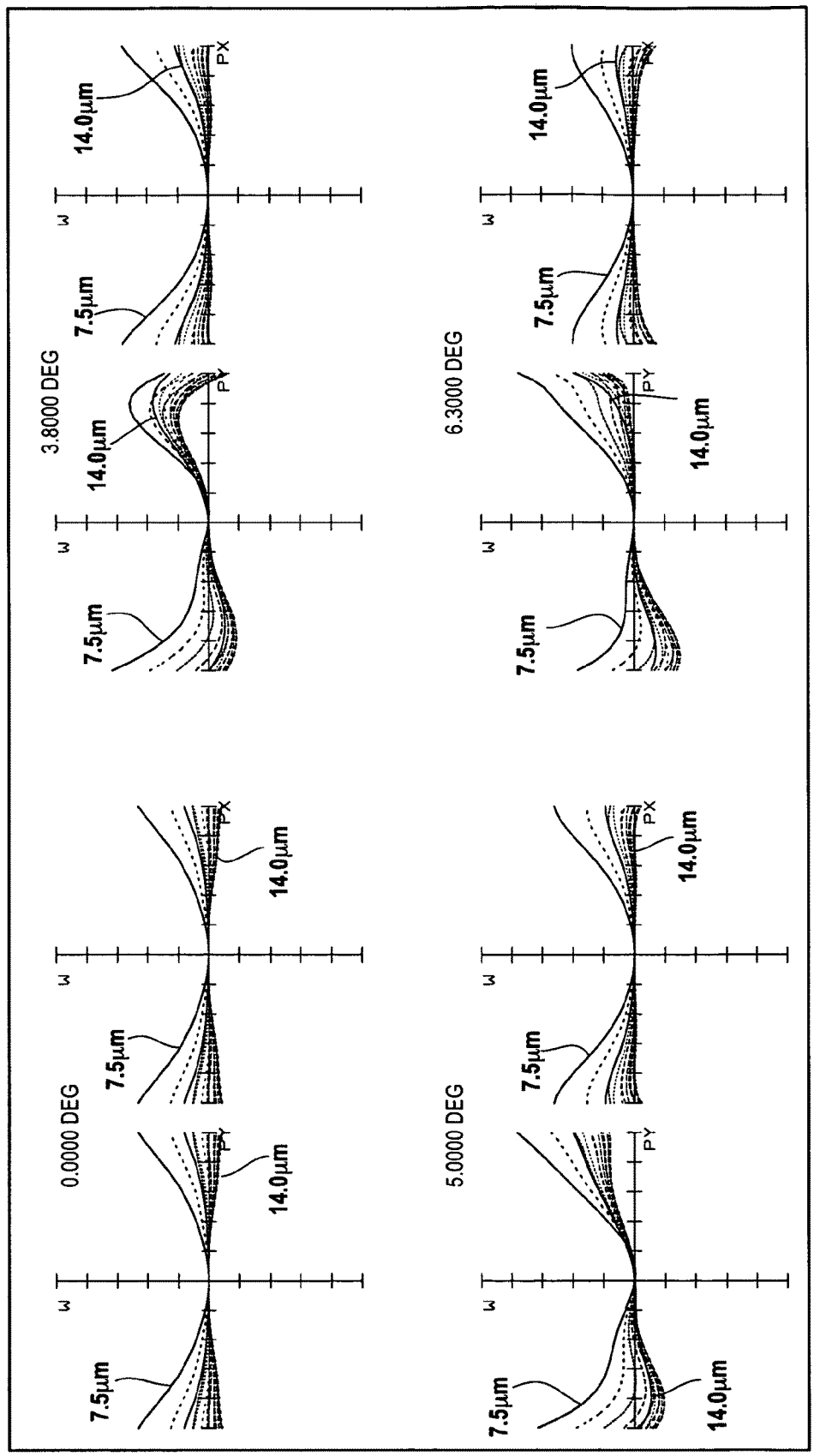
Figure 21:
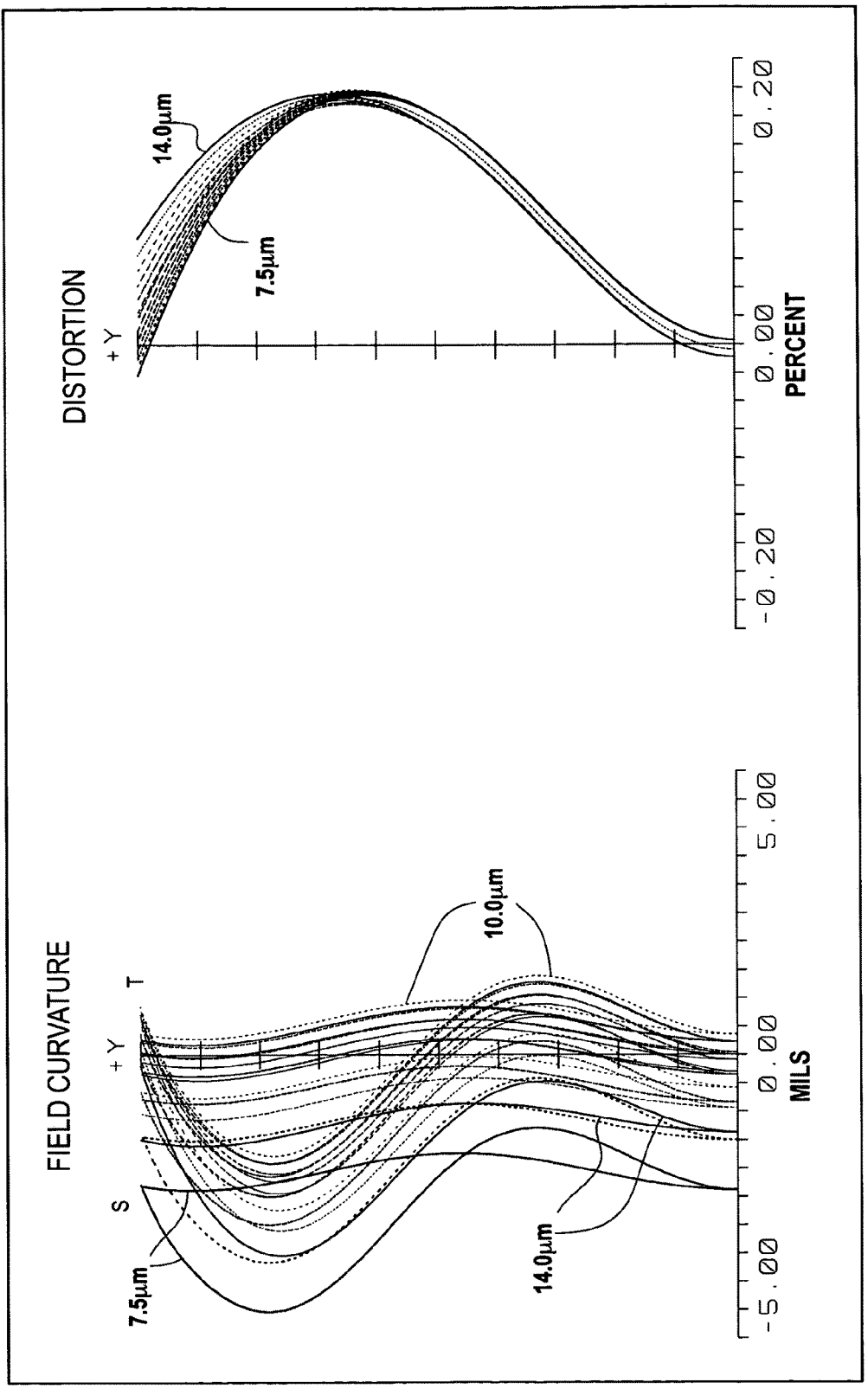
Figure 22:
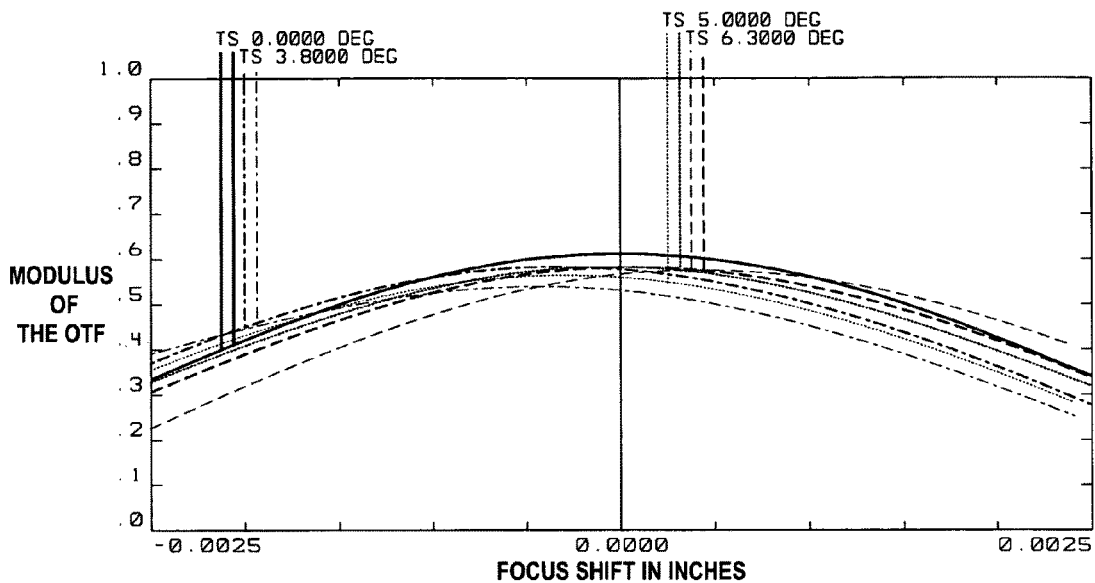
Figure 23:
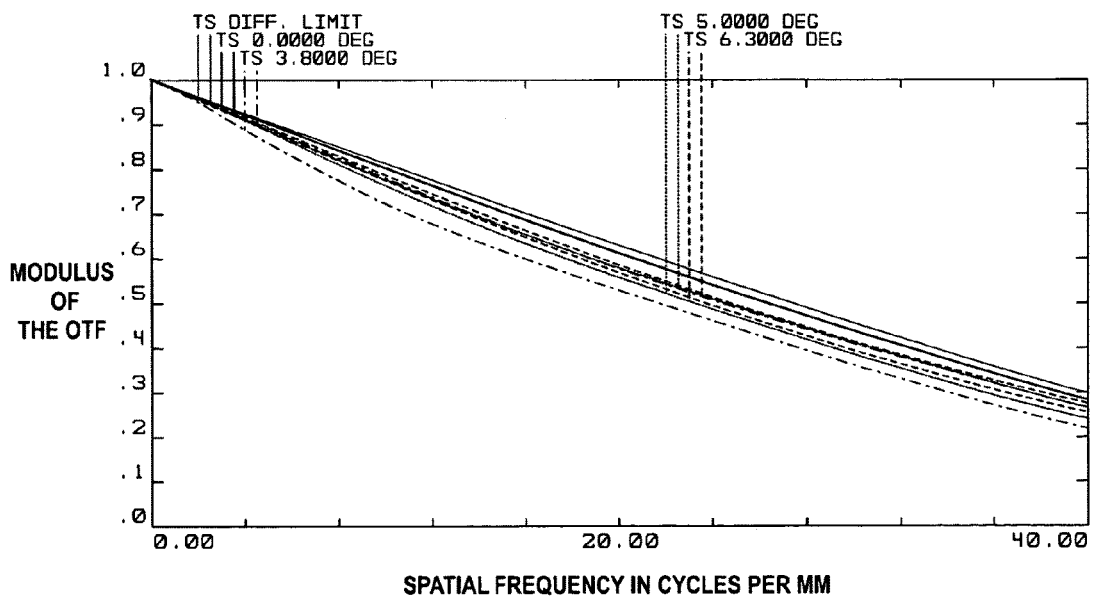
Figure 24:
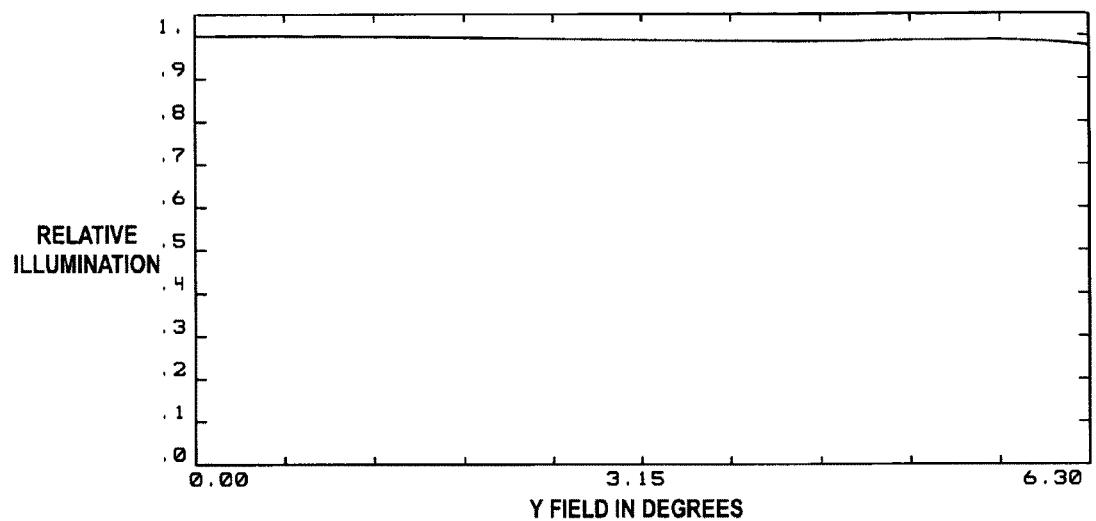
Figure 25:
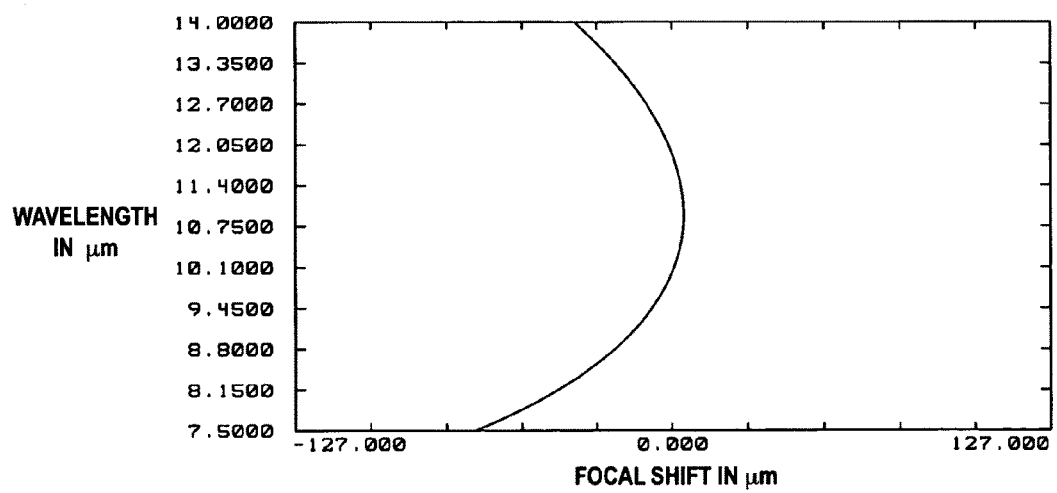

FIGS. 19-25 are performance curves showing the optical performance of the lens design of the third embodiment of FIG. 18. The design features diffraction-limited performance. In particular, FIG. 19 is a transverse ray fan plot; FIG. 20 is a plot of the optical path difference; FIG. 21 are plots of the close sagittal (S) and tangential (T) field curvature and distortion; FIG. 22 is a plot of the polychromatic through-focus diffraction modulation-transfer-function; FIG. 23 is a plot of the polychromatic best-focus diffraction modulation-transfer-function; FIG. 24 is a plot of relative illumination as a function of field angle; and FIG. 25 is a plot of the paraxial focus as a function of wavelength in the long-wave infrared band of the electromagnetic spectrum.

The commentary provided above regarding the performance curves of FIGS. 3-9 is also applicable to the performance curves of FIGS. 19-25.

From the foregoing, it will be appreciated that I have disclosed a two-element objective lens 14 for an infrared optical system (e.g., sight 10, or other optical system; see FIGS. 2, 10 and 18 and the above description), comprising:

a) a first lens element (30) receiving incident radiation and having front and rear surfaces (32 and 34), b) a second lens element (40) receiving incident radiation from the first lens element (30) and having front and rear surfaces (42 and 44), the first and second lenses forming an image on a focal plane (50); wherein at least three of said surfaces of the first and second elements comprise aspheric surfaces; the lens has an f-number less than about 2; the lens has a field-of-view less than about 30 degrees; the lens has an effective focal length less than about 6 inches; and the first and second elements are made from a material selected to pass radiation in the infrared band of the electromagnetic spectrum (see Examples 1, 2 and 3).

It will also be appreciated that I have disclosed an IR sight (FIGS. 1, 10) for a weapon (12) comprising: a detector for detecting infrared radiation (not shown but positioned at the focal plane 50 in FIGS. 2, 10 and 18); and an, objective lens 14 comprising a) a first element (30, FIGS. 2, 10, 18) receiving incident radiation and having front and rear surfaces (32 and 34), and b) a second element (40, FIGS. 2, 10, 18) receiving incident radiation from the first element and having front and rear surfaces (42 and 44) and directing light onto the detector, the detector located at a focal plane of the object lens; wherein at least three of said surfaces (32, 34, 42 and 44) of the first and second elements comprise aspheric surfaces; the lens has an f-number less than about 2; the lens has a field-of-view less than about 30 degrees; the lens has an effective focal length less than about 6 inches; and the first and second elements are made from a material selected to pass radiation in the infrared band of the electromagnetic spectrum. The sight is designed to operate in the long-wave IR.

It will also be appreciated that gunnery apparatus has, been disclosed comprising a weapon (FIG. 1, rifle 12, however the weapon may take the form of any small arms, including shoulder launched missile system); and a long-wave IR weapon sight (10) mounted to the weapon, wherein the sight includes an objective lens as characterized in the preceding paragraph.

Variations from the disclosed embodiments may be made to arrive at lens designs for weapon sights which are optimized for the near- and mid-wave IR bands.

While a number of exemplary aspects and embodiments have been discussed above, those of skill in the art will recognize that certain modifications, permutations, additions and sub-combinations thereof are possible and within the scope of this disclosure. It is therefore intended that the following appended claims and claims hereafter introduced are interpreted to include all such modifications, permutations, additions and sub-combinations as are within their true spirit and scope.

Lens prescriptions are provided in Appendices A, B and C for the three embodiments of FIGS. 2, 10 and 18, respectively. The lens prescriptions comprise data for six surfaces. Four of these surfaces represent the four optical surfaces 32, 34, 42 and 44. One surface represents the aperture stop 66 and one surface represents the image plane 50. This is a typical convention.

APPENDIX A

Prescription Data for 28.3 mm F/1.1 Two Element IR Objective Lens (FIG. 2)

(All dimensions in inches unless otherwise noted)

| Surface | Radius | Thickness | Material |
|---------|--------|-----------|----------|
| 1 | 0.9361 | 0.2000 | Germanium |
| 2 | 0.9044 | 0.1128 | Air |
| 3 ApStop | Infinity | 0.6286 | Air |
| 4 | 1.0870 | 0.1600 | Germanium |
| 5 | 1.3856 | 0.5048 | Air |
| 6 | Infinity | | |

EFL = 1.1142 in (28.3 mm)
BFL = 0.5048 in (12.8 mm)
F/no = 1.1
Max field angle = ±11.2°

Aspheric sag equation $$x = \frac{cy^2}{1+\sqrt{1-(1+k)c^2y^2}} + a_4 y^4 + a_6 y^6 + a_8 y^8 + a_{10} y^{10} + a_{12} y^{12} + a_{14} y^{14},$$

and $c = 1/R$, where $R$ = surface vertex radius of curvature, and $k = 0$.

| Surface | $a_4$ | $a_6$ | $a_8$ | $a_{10}$ | $a_{12}$ | $a_{14}$ |
|---|---|---|---|---|---|---|
| 1 | −0.0114887 | −0.2476677 | −0.4430739 | −1.6941051 | 0 | 0 |
| 2 | −0.0551191 | 0.6704414 | −17.446482 | 95.150755 | −325.0453 | 464.1025 |
| 3 | −0.0957026 | 9.4635773 | −201.52160 | 1944.3483 | −9928.269 | 19531.649 |
| 4 | 0.2346495 | 4.6964066 | −162.59895 | 1805.3669 | −11641.275 | 29749.077 |

APPENDIX B

Prescription Data for 50.3 mm F/1.4 Two Element IR Objective Lens (FIG. 10)

(All dimensions in inches unless otherwise noted)

| Surface | Radius | Thickness | Material |
|---|---|---|---|
| 1 | 1.5420 | 0.2253 | Germanium |
| 2 | 1.6679 | 0.6169 | Air |
| 3 ApStop | Infinity | 0.8581 | Air |
| 4 | 1.2437 | 0.1646 | Germanium |
| 5 | 1.3001 | 0.6508 | Air |
| 6 | Infinity | | |

EFL = 1.9803 in (50.3 mm)
BFL = 0.6538 in (16.6 mm)
F/no = 1.4
Max field angle = ±12.4°

| Surface | $a_4$ | $a_6$ | $a_8$ | $a_{10}$ | $a_{12}$ | $a_{14}$ |
|---|---|---|---|---|---|---|
| 2 | 0.0037878 | 0.0008044 | −0.0020730 | 0.0060845 | 0 | 0 |
| 4 | 0.0831271 | −0.6283548 | 0.4442759 | −2.923870 | 0 | 0 |
| 5 | 0.1448260 | −0.7869888 | −1.595910 | 0.5928106 | 0 | 0 |

APPENDIX C

Prescription Data for 101.4 mm F/1.4 Two Element LWIR Objective Lens (FIG. 18)

(All dimensions in inches unless otherwise noted)

| Surface | Radius | Thickness | Material |
|---|---|---|---|
| 1 | 2.7688 | 0.4044 | Germanium |
| 2 | 3.2343 | 0.3110 | Air |
| 3 ApStop | Infinity | 2.5352 | Air |
| 4 | 14.7544 | 0.2500 | Zinc Sulfide |

-continued

| Surface | Radius | Thickness | Material |
|---|---|---|---|
| 5 | 7.4629 | 0.5007 | Air |
| 6 | Infinity | | |

EFL = 3.9921 in (101.4 mm)
BFL = 0.5008 in (12.7 mm)
F/no = 1.4
Max field angle = ±6.3°

| Surface | $a_4$ | $a_6$ | $a_8$ | $a_{10}$ | $a_{12}$ | $a_{14}$ |
|---|---|---|---|---|---|---|
| 2 | 0.00045143 | 9.34788E−7 | 1.88665E−5 | −2.81036E−6 | 0 | 0 |
| 4 | −0.5898442 | 0.9658812 | −8.450842 | 16.751029 | 0 | 0 |
| 5 | −0.6300740 | 0.7823646 | −5.434816 | 11.047694 | 0 | 0 |

I claim:

1. A two-element objective lens for an infrared optical system, consisting of:
    a) a first lens element receiving incident radiation and having front and rear surfaces,
    b) a second lens element receiving incident radiation from the first lens element and having front and rear surfaces, the first and second lenses forming an image on a focal plane; and
    c) an aperture stop placed between the first and second lens elements;
    wherein at least three of said surfaces of the first and second elements comprise aspheric surfaces;
    the lens has an f-number of between 1.1 and 1.4;
    the lens has a maximum radial field of between 5 and 15 degrees;
    the lens has an effective focal length less than about 6 inches; and
    the first and second elements are made from one or more materials selected to pass radiation in a desired infrared band of the electromagnetic spectrum; and
    wherein the lens features diffraction-limited performance in which the value of the modulation transfer function approximately matches a diffraction limit of the lens.

2. The lens of claim 1, wherein the aperture stop is proximate to the first lens.

3. The lens of claim 1, wherein the lens is unvignetted at all field angles.

4. The lens of claim 1, wherein the first and second lens elements are made from Germanium.

5. The lens of claim 1, wherein the lens is made in accordance with a lens prescription, the lens prescription comprising data for the six surfaces comprising the front and rear surfaces of the first and second lens elements, the aperture stop, and the surface of the focal plane.

6. Gunnery apparatus, comprising:

a weapon;

an infrared sight mounted to the weapon; wherein the sight includes a lens as claimed in claim 1; and wherein the lens is unvignetted at all field angles.

7. The gunnery apparatus of claim 6, further comprising an un-cooled detector placed at the focal plane of the lens.

* * * * *